June 9, 1964     M. MOLLICK     3,136,969
ELECTRIC TRANSDUCER
Filed Oct. 12, 1962     2 Sheets-Sheet 1
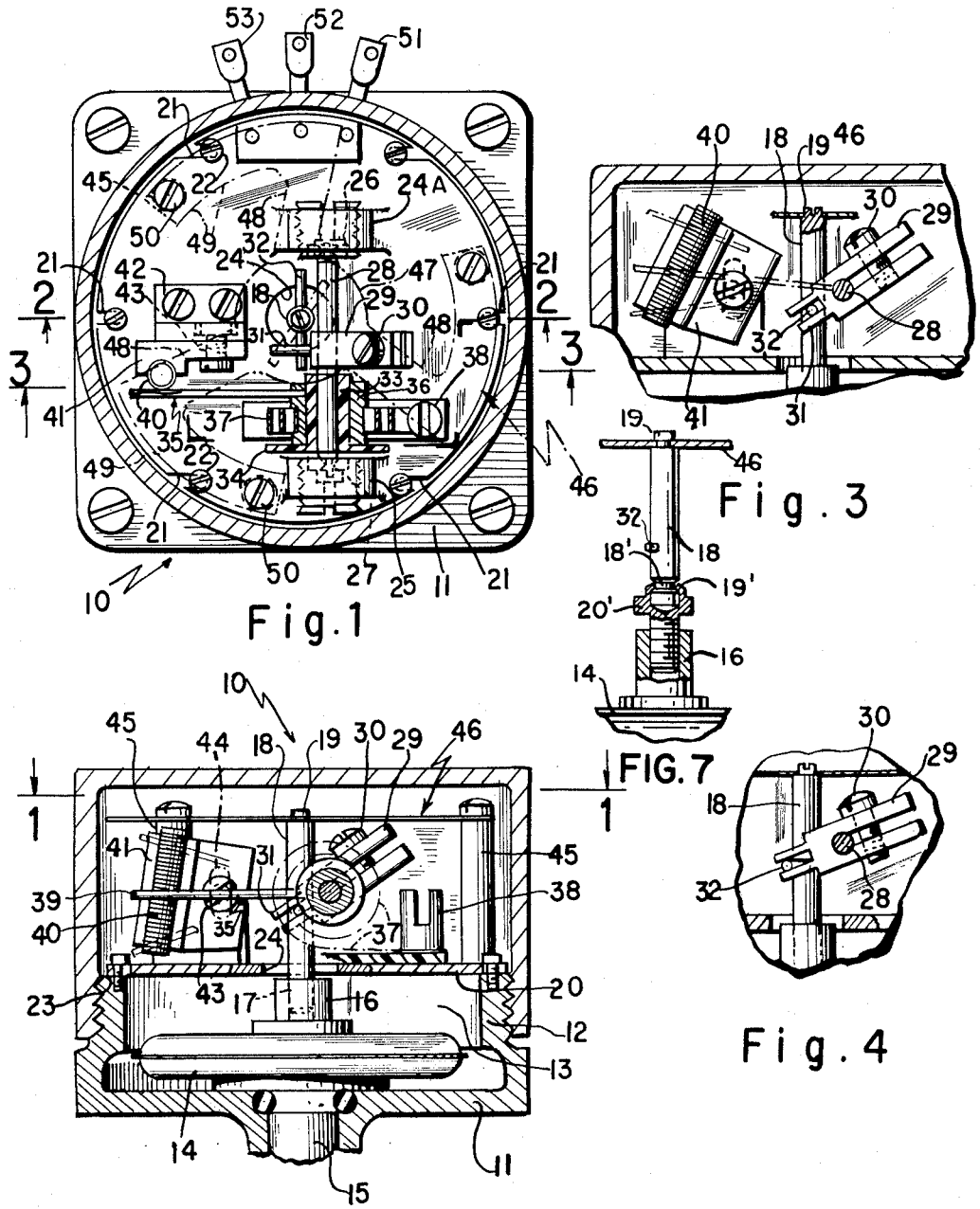
INVENTOR
MILTON MOLLICK
BY
Robertson and Smythe
ATTORNEYS.

June 9, 1964  M. MOLLICK  3,136,969
ELECTRIC TRANSDUCER
Filed Oct. 12, 1962  2 Sheets-Sheet 2

INVENTOR
MILTON MOLLICK
BY
Robertson and Smythe
ATTORNEYS.

# United States Patent Office 3,136,969
Patented June 9, 1964

3,136,969
ELECTRIC TRANSDUCER
Milton Mollick, Allentown, Pa., assignor to Ametek, Inc., New York, N.Y., a corporation of Delaware
Filed Oct. 12, 1962, Ser. No. 230,117
14 Claims. (Cl. 338—41)

The present invention relates to transducers, and particularly to a new and improved transducer for converting variations in pressure into varying electric signals.

The principal object of this invention is to provide a fluid pressure to electric signal transducer capable of withstanding severe shock and vibrations without affecting its accuracy.

Another object of the invention is to provide a pressure transducer having a capsular pressure-sensing element which actuates the brush of a precision potentiometer.

Still another object of the invention is to provide such a transducer in which the output of the precision potentiometer, in resistance ratio, is linearly proportional to changes in input pressure.

Still another object of the invention is to provide a pressure transducer in which adjustment is provided for producing different degrees of amplification of the conversion linkages.

Still another object of the invention is to provide such a transducer including adjustments making it possible to use different portions of the pressure-sensitive movement that is converted into arcuate movement of the potentiometer brush.

Still another object of the invention is to provide such a transducer in which the input to output curve (scale shape) may be varied by adjusting the angular position of the potentiometer mounting.

Still another object of the invention is to provide such a transducer in which the base supporting the components of the instrument is adjustable to vary their relation with the pressure-sensitive device.

A still further object of the invention is to provide such a pressure transducer so constructed as to provide vibration stabilization.

In one aspect of the invention, a housing for the transducer may support a capsular pressure-sensitive element which may take the form of an expansible bellows having a connection adapted to connect the interior chamber of the element with a source of fluid pressure desired to be measured. One face of the capsular element may have a rod fixed to it, said rod being capable of linear movement upon subjecting the inner chamber of the capsular element to pressure fluctuations.

In another aspect of the invention, a component supporting plate may be mounted in said housing and may include a central passage through which the rod extends. The component supporting plate may be provided with elongated passages that are parallel to each other at various points through which fastening means may pass. The parallel construction of the elongated passages facilitates the bodily adjustment of certain components in relation to the linearly movable rod so as to adjust range.

In another aspect of the invention, an oscillatable shaft may be mounted on antifriction bearings at right angles to, and closely spaced from the linearly movable rod. A link may be adjustably clamped to the shaft such that a bifurcated portion thereof receives a pin passing through the rod. The construction may be such that by turning the rod, the point of engagement between the pin and bifurcated portion changes so that different oscillatory angles of motion may be imparted to the shaft with the same linear movement of the rod.

In still another aspect of the invention, an arm may be secured to the oscillatable shaft, and at its free end a contact brush may be fixed for sliding engagement with the resistor of a potentiometer as dictated by the linear position of the rod that oscillates the shaft. The arm may be resiliently biased in a direction by a coiled hair spring or the like, so that the contact brush normally is at one end of the resistor.

In still another aspect of the invention, the mounting for the potentiometer may be adjustable so that the path of travel of the contact brush thereover may be angularly changed to reduce to a minimum any errors due to non-linearity of the potentiometer or pressure device, or both.

In still another aspect of the invention, the linearly movable rod may be provided with means for ensuring great lateral stability without inhibiting its free linear movement in order to attain accuracy of conversion of pressure variations to electrical signals.

The above, other objects and novel features of the invention will become apparent from the following specification and accompanying drawings which are merely exemplary.

In the drawings:

FIG. 1 is a top plan view of a pressure transducer as viewed along line 1—1 of FIG. 2 and to which the principles of the invention have been applied;

FIG. 2 is a sectional elevational view taken substantially along line 2—2 of FIG. 1;

FIGS. 3 and 4 are partial sectional elevational views taken substantially along line 3—3 of FIG. 1, and showing certain elements of the transducer in different adjusted positions;

FIG. 7 is a modified form of certain elements of the apparatus.

Figure 5:
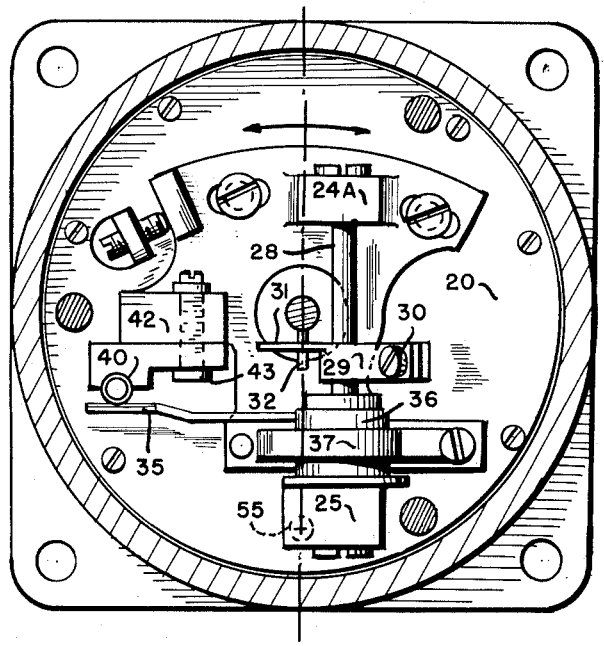
FIGS. 5 and 6 are two views similar to that of FIG. 1, showing another embodiment of the invention.

Referring to the drawings, the principles of the invention are shown as applied to a pressure transducer 10 including a support 11 having a wall 12 surrounding said support and forming a chamber 13 within which may be located a capsule-type pressure-sensitive element 14. The element 14 may comprise an expansible chamber having a fitting 15 for connection with a supply of fluid pressure desired to be measured.

Another fitting 16 may be fixed to the top surface of the capsule 14 and it does not communicate with the interior thereof as does fitting 15. The fitting 16 may be provided with a threaded bore 17 into which may be screwed a rod 18 having an upper end 19 of reduced diameter and provided with a screw driver slot in the end thereof for a purpose to be described.

A component supporting plate 20 may include a plurality of elongated through passages 21, the major axes of which are all parallel. Screws 22 may pass through said passages and thread into tapped holes within the top peripheral edge 23 of wall 12. The plate 20 may be provided with a central passage 24 through which the rod 18 passes. A bracket having parallel legs 24A and 25 and mounted on plate 20 may support antifriction bearings 26, 27 in aligned relation for journaling an oscillatable shaft 28. The arrangement is such that shaft 28 is at right angles to rod 18 and in close proximity thereto. An element 29 may be adjustably clamped to shaft 28 by a screw 30, and the element 29 may include a bifurcated portion 31 adapted to receive a pin 32 that extends transversely through the rod 18. The portion of element 29 containing screw 30 is designed as a counterbalance for the combined effects of bifurcated end 31 and action of rod 18 to provide vibration stabilization.

From the foregoing it is evident that linear motion of rod 18, incident to pressure varations in capsule 14, will cause oscillation of shaft 28 through the action of pin 32 between the legs of the bifurcation 31. Furthermore, by adjustably turning the rod 18 and the element 29, different degrees of oscillations of shaft 28 can be imparted to it by the same or different portions of the linear movement of rod 18. This is occasioned by virtue of the different points of contact between the pin 32 and the bifurcation 31 as well as by the angularly adjusted position of element 29 on shaft 28.

The threaded connection between rod 18 and fitting 16 causes linear motion of rod 18 in adjusting it angularly to vary the position at which pin 32 engages the legs of the bifurcation 31. Alternatively, and referring to FIG. 7, the lower end of rod 18 may be provided with a groove 18' into which a flange 19' of a nut element 20' may be crimped so as to provide a free turning bearing between rod 18 and nut element 20'. The lower end of the nut element 20' is externally threaded for attachment to fitting 16. With this alternate form, rotation of nut element 20' will provide axial adjustment of rod 18 independently of its angular position, and rotation of rod 18 will provide angular adjustment of rod 18 independently of its axial position.

The shaft 28 is adapted to have keyed or otherwise fixed to it an insulating bushing 33 having a flange 34 for a purpose to be described later. An arm 35 may extend radially from a sleeve 36 that is in turn fixed to bushing 33. One end of a coiled spring 37 may be fixed to sleeve 36, and the other end of spring 37 may be connected to a terminal 38 mounted for turning motion on the plate 20. The free end 39 of arm 35 may support a contact brush for riding over and in contact with an electrical resistance coil 40 of a precision potentiometer. The coil 40 may be embedded in a non-conductive holder 41 supported by a bracket 42 that is mounted on plate 20. A screw 43 may extend through an elongated hole 44 for adjustably fixing the holder 41 to bracket 42 so that the angular relation of the axis of coil 40 can be adjusted relative to the path of travel of the contact brush on arm 35.

In order to provide lateral stability to the rod 18 during its linear motions, three standards 45 may be mounted on plate 20 and may terminate at an elevation substantially equal to that of the rod 18. An element 46 of relatively thin sheet material may include a central portion 47 having a central aperture for receiving the reduced end 19 of rod 18. The central portion 47 may include legs having radial portions 48 and circumferential portions 49, and the ends of the latter may be fixed to the top of standards 45 by screws 50.

Terminals 51, 52 and 53 may be provided and they are appropriately connected to the precision potentiometer 40 for utilizing the transduced electrical signals representing variations in fluid pressure within capsule 14.

Figure 6:
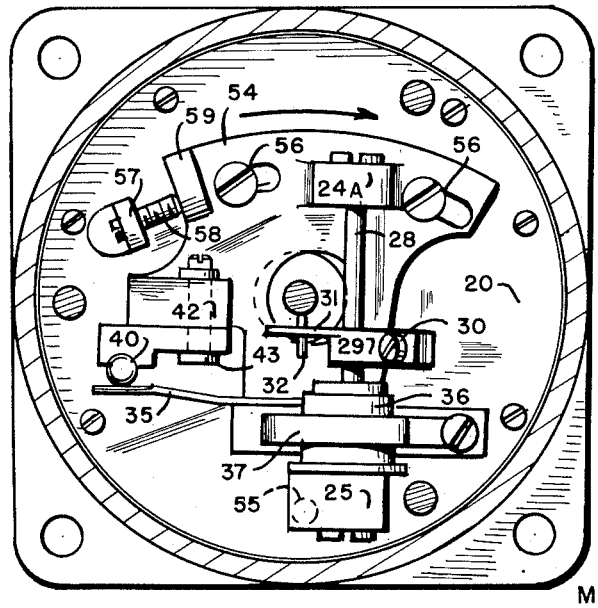

Referring to FIGS. 5 and 6, the bearings 24, 25, shaft 28 and bracket 42 are not mounted on the plate 20, but rather on an auxiliary plate 54 that is pivotally mounted on a pin 55 on plate 20. The plate 54 may include arcuate slot and screw means 56 for pivotally adjusting it about pivot pin 55. An upstanding flange 57 from plate 20 may support a screw 58 that acts on an abutment 59 on plate 54 for effecting its pivotal adjustment. By adjusting plate 54 about pin 55, the point of contact between arm 31 and pin 32 is changed, thereby varying the distance between said point and the axis of shaft 28 so as to vary the range of movement of the brush on arm 35.

Although the various features of the new and improved transducer have been shown and described in detail to fully disclose one embodiment of the invention, it will be evident that changes may be made in such details and certain features may be used without others without departing from the principles of the invention.

What is claimed is:

1. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, parallel to each other and at right angles to said shaft, for receiving fastening means for adjustably fixing said plate to said housing; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; and flexible means supported by said plate and cooperating with the end of said rod opposite that connected to said pressure responsive element for imparting lateral stability to said rod without inhibiting its linear movement.

2. In a transducer, a housing; a pressure-responsive element in said housing; means for connecting said element to a source of fluid pressure; a linearly movable rod threaded into a fitting connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; and flexible means supported by said plate and cooperating with the end of said rod opposite that connected to said pressure responsive element for imparting lateral stability to said rod without inhibiting its linear movement.

3. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; means for adjusting the axis of the coil of said potentiometer relative to the path of movement of said contact brush means; and flexible means supported by said plate and cooperating with the end of said rod opposite that connected to said pressure responsive element for imparting lateral stability to said rod without inhibiting its linear movement.

4. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; resilient means normally biasing said arm so that said contact brush means is urged toward one end of the coil of said potentiometer; and flexible means supported by said plate and cooperating with the end of said rod opposite that connected to said pressure responsive element for imparting lateral stability to said rod without inhibiting its linear movement.

5. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, parallel to each other and at right angles to said shaft, for receiving fastening means for adjustably fixing said plate to said housing; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; a plurality of standards on said plate and terminating at substantially the same elevation as the end of said rod; and means connected to said standards for imparting lateral stability to said rod without inhibiting its linear movement.

6. In a transducer, a housing; a pressure-responsive element in said housing; means for connecting said element to a source of fluid pressure; a linearly movable rod threaded into a fitting connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; a plurality of standards on said plate and terminating at substantially the same elevation as the end of said rod; and means connected to said standards for imparting lateral stability to said rod without inhibiting its linear movement.

7. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; means for adjusting the axis of the coil of said potentiometer relative to the path of movement of said contact brush means; a plurality of standards on said plate and terminating at substantially the same elevation as the end of said rod; and means connected to said standards for imparting lateral stability to said rod without inhibiting its linear movement.

8. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; resilient means normally biasing said arm so that said contact brush means is urged toward one end of the coil of said potentiometer; a plurality of standards on said plate and terminating at substantially the same elevation as the end of said rod; and means connected to said standards for imparting lateral stability to said rod without inhibiting its linear movement.

9. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; means on said shaft adapted to cooperate with means on said rod for causing said shaft to turn proportionately to the linear movement of said rod; resilient means normally biasing said arm so that said contact brush means is urged toward one end of the coil of said potentiometer; means for adjusting the effectiveness of said resilient means; a plurality of standards on said plate and terminating at substantially the same elevation as the end of said rod; and means connected to said standards for imparting lateral stability to said rod without inhibiting its linear movement.

10. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a potentiometer mounted on said plate; arm means connected to said shaft and supporting contact brush means in engagement with the coil of said potentiometer; pin means in said rod; an element adjustably clamped to said shaft having a bifurcated portion in position to receive said pin means between the legs thereof, and a counterbalance portion extending from said shaft oppositely to said bifurcated portion, whereby turning said rod and bifurcated portion provides a wide range of adjustments that affect the amplification of the conversion of the linear motion of said rod to the oscillatory motion of said shaft, and said counterbalance portion provides vibration stability; a plurality of standards on said plate and terminating at substantially the same elevation as the end of said rod; and means connected to said standards for imparting lateral stability to said rod without inhibiting its linear movement.

11. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, parallel to each other and at right angles to said shaft, for receiving fastening means for adjustably fixing said plate to said housing; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; a plurality of standards on said plate and terminating at substantially the same elevation as the end of said rod; and means connected to said standards for imparting lateral stability to said rod without inhibiting its linear movement.

12. In a transducer, a housing; a pressure responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, paralel to each other and at right angles to said shaft, for receiving fastening means for adjustably fixing said plate to said housing; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; means for adjusting the axis of the coil of said potentiometer relative to the path of movement of said contact brush means; a plurality of standards on said plate and terminating at substantially the same elevation as the end of said rod; and means connected to said standards for imparting lateral stability to said rod without inhibiting its linear movement.

13. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, parallel to each other and at right angles to said shaft, for receiving fastening means for adjustably fixing said plate to said housing; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; means for adjusting the axis of the coil of said potentiometer relative to the path of movement of said contact brush means; resilient means normally biasing said arm so that said contact brush means is urged toward one end of the coil of said potentiometer; a plurality of standards on said plate and terminating at substantially the same elevation as the end of said rod; and means connected to said standards for imparting lateral stability to said rod without inhibiting its linear movement.

14. In a transducer, a housing; a pressure-responsive element in said housing; means for connecting said element to a source of fluid pressure; a linearly movable rod connected to said element; a supporting plate in said housing and covering said element, said plate having through passage means through which said rod extends; a shaft journaled in bearings mounted on said plate, said shaft being at right angles to said rod; a plurality of elongated passage means, parallel to each other and at right angles to said shaft, for receiving fastening means for adjustably fixing said plate to said housing; a potentiometer mounted on said plate; arm means connected to said shaft and supporting contact brush means in engagement with the coil of said potentiometer; pin means in said rod; a bifurcated element adjustably clamped to said shaft in position to receive said pin means between the legs of said bifurcated element, whereby turning said rod and bifurcated element provides a wide range of adjustments that affect the amplification of the conversion of the linear motion of said rod to the oscillatory motion of said shaft; means for adjusting the axis of the coil of said potentiometer relative to the path of movement of said contact brush means; resilient means normally biasing said arm so that said contact brush means is urged toward one end of the coil of said potentiometer; means for adjusting the effectiveness of said resilient means; a plurality of standards on said plate and terminating at substantially the same elevation as the end of said rod; and means connected to said standards for imparting lateral stability to said rod without inhibiting its linear movement.

References Cited in the file of this patent
UNITED STATES PATENTS
2,886,679    Jonke  _____ May 12, 1959